(12) United States Patent
Kang et al.

(10) Patent No.: US 9,371,976 B2
(45) Date of Patent: *Jun. 21, 2016

(54) ILLUMINATION APPARATUS (71) Applicant: SOUTHERN TAIWAN UNIVERSITY OF SCIENCE AND TECHNOLOGY, Tainan (TW)

(72) Inventors: Chih-Chieh Kang, Tainan (TW); Jeng-Feng Lin, Yulin County (TW); Ching-Yu Chen, Taichung (TW); Syue-An Ceng, Hsinchu County (TW); Kai-Ming Chuang, Tainan (TW); Yu-Rui Yang, Tainan (TW)

(73) Assignee: SOUTHERN TAIWAN UNIVERSITY OF SCIENCE AND TECHNOLOGY, Tainan (TW)

( * ) Notice: Subject to any disclaimer, the term of this patent is extended or adjusted under 35 U.S.C. 154(b) by 224 days.

This patent is subject to a terminal disclaimer.

(21) Appl. No.: 13/975,272

(22) Filed: Aug. 23, 2013

(65) Prior Publication Data
US 2014/0055995 A1    Feb. 27, 2014

(30) Foreign Application Priority Data

Aug. 27, 2012 (TW) .............................. 101131080 A (51) Int. Cl.
*F21V 7/04* (2006.01)
*F21V 7/00* (2006.01)
*G02F 1/1335* (2006.01)
*F21Y 111/00* (2006.01)

(52) U.S. Cl.
CPC . *F21V 7/048* (2013.01); *F21V 7/00* (2013.01); *G02F 1/133603* (2013.01); *G02F 1/133605* (2013.01); *F21Y 2111/002* (2013.01)

(58) Field of Classification Search
CPC ................... G02F 1/133602; G02F 1/133603; G02F 1/133604; G02F 1/133605; G02F 1/133606; G02F 1/133608; F21V 7/00; F21V 7/048; F21Y 2111/002
See application file for complete search history.

(56) References Cited

U.S. PATENT DOCUMENTS

| 7,891,840 B1 * | 2/2011 | Kang | ........................ F21K 9/00 362/249.02 |
| 9,068,716 B2 * | 6/2015 | Kang | ...................... F21V 7/048 |
| 2011/0032698 A1 | 2/2011 | Kim | |

FOREIGN PATENT DOCUMENTS

| CN | 1978979 A | 6/2007 |
| CN | 101782186 A | 7/2010 |
| CN | 102374423 A | 3/2012 |

\* cited by examiner

*Primary Examiner* — Stephen F Husar
(74) *Attorney, Agent, or Firm* — Cheng-Ju Chiang (57) ABSTRACT

An illumination apparatus includes a frame, an optical base plate, a light source and an optical film. The optical base plate is disposed in the frame and has a first protrusion portion at the center of the optical base plate. The first protrusion portion has at least a reflective surface and a top surface, which are connected with each other. The light source is disposed in the frame and located adjacent to the periphery of the optical base plate. The light source is disposed corresponding to the reflective surface and has a plurality of light-emitting elements. Each light-emitting element has an optical axis direction, and the optical axis directions extend toward the first protrusion portion. The optical film is disposed at the frame, and the first protrusion portion of the optical base plate protrudes toward the optical film.

10 Claims, 11 Drawing Sheets

ILLUMINATION APPARATUS

CROSS REFERENCE TO RELATED APPLICATIONS

This Non-provisional application claims priority under 35 U.S.C. §119(a) on Patent Application No(s). 101131080 filed in Taiwan, Republic of China on Aug. 27, 2012, the entire contents of which are hereby incorporated by reference.

BACKGROUND OF THE INVENTION

1. Field of Invention

The present invention relates to an illumination apparatus and, in particular, to an illumination apparatus without a light guiding plate.

2. Related Art

In industrial countries, the illuminations consume a remarkable ratio in the entire electricity consumption. According to some researches, in the top 5 industrial countries, the illuminations consume 15% or more of the entire electricity consumption. Based on the potential threat of limited petroleum deposit, the devices with low power consumption have become the most popular products and the most important developing trend.

In order to minimize the electricity wasted in illumination, the illumination lamps with lower power consumption are developed. Currently, the most popular illumination lamps with lower power consumption are definitely LED lamps, which have the advantages of low power consumption, low public pollution, long lifetime, high safety, short lighting response, and small size.

The flat lamp is light and decorative and has a uniform and large lighting surface, so it is a popular choice among the existing illumination lamps. The conventional flat lamp has a structure similar to the backlight module of a display apparatus, which includes a light guiding plate. The function of the light guiding plate is to guide and transmit the emitted light. In more detailed, the light enters the input surface of the light guiding plate, and is then transmitted within the light guiding plate by total reflection. Finally, the light is emitted through an output surface of the light guiding plate so as to generate a uniform output light.

However, since the light has been reflected for many times, the energy of the light is lost so as to decrease the light extraction efficiency (about 60-65%). Besides, the additionally arranged light guiding plate may increase the weight of the flat lamp as well as the cost thereof.

Therefore, it is an important subject of the present invention to provide an illumination apparatus with lower cost, higher light extraction efficiency and better light output uniformity.

SUMMARY OF THE INVENTION

To achieve the above objective, the present invention discloses an illumination apparatus, which includes a frame, an optical base plate, a light source and an optical film. The optical base plate is disposed in the frame and has a first protrusion portion at the center of the optical base plate. The first protrusion portion has at least a reflective surface and a top surface, which are connected with each other. The light source is disposed in the frame and located adjacent to the periphery of the optical base plate. The light source is disposed corresponding to the reflective surface and has a plurality of light-emitting elements. Each light-emitting element has an optical axis direction, and the optical axis directions extend toward the first protrusion portion. The optical film is disposed at the frame, and the first protrusion portion of the optical base plate protrudes toward the optical film.

As mentioned above, the illumination apparatus of the invention has an optical base plate with a first protrusion portion. The first protrusion portion has at least a reflective surface and a top surface connected with each other. The light source is located adjacent to the periphery of the optical base plate, and is disposed corresponding to the reflective surface. The light source has a plurality of light-emitting elements, each of which has an optical axis direction extending toward the first protrusion portion. Accordingly, the conventional light guiding plate is unnecessary in the illumination apparatus of the invention, and the illumination apparatus of the invention has the advantages of lower cost, higher light extraction efficiency and better light output uniformity.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
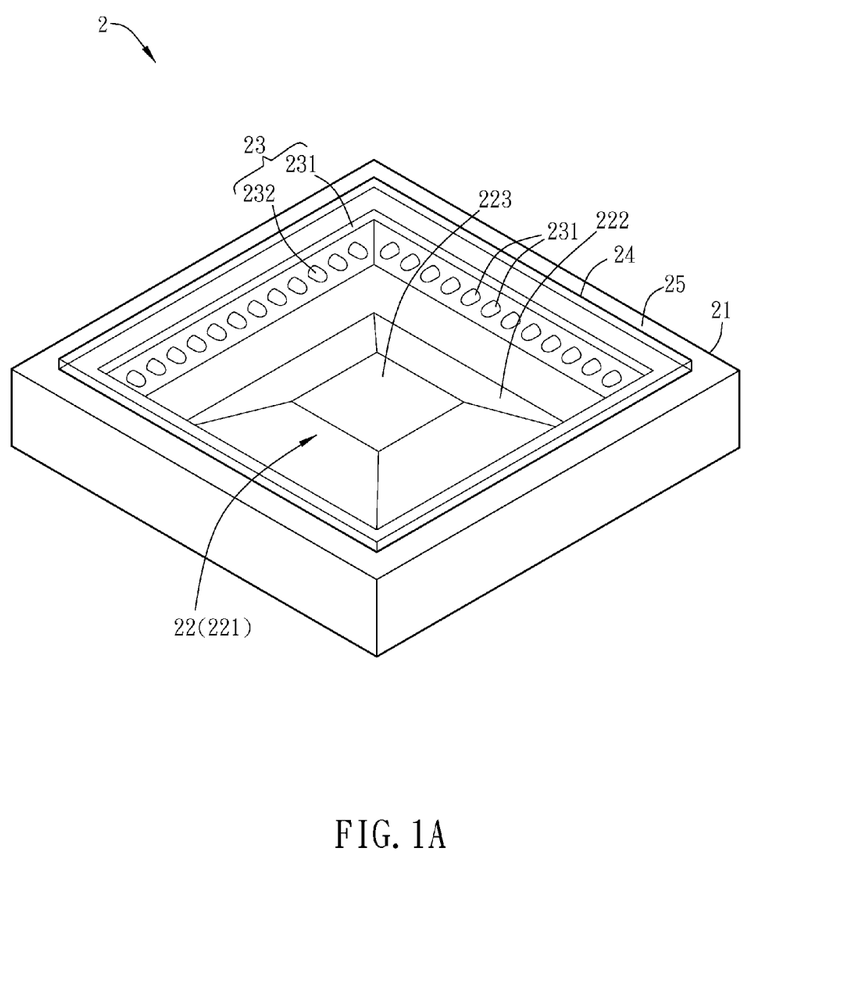
FIG. 1A is a perspective diagram of an illumination apparatus according to a preferred embodiment of the invention.
Figure 1B:
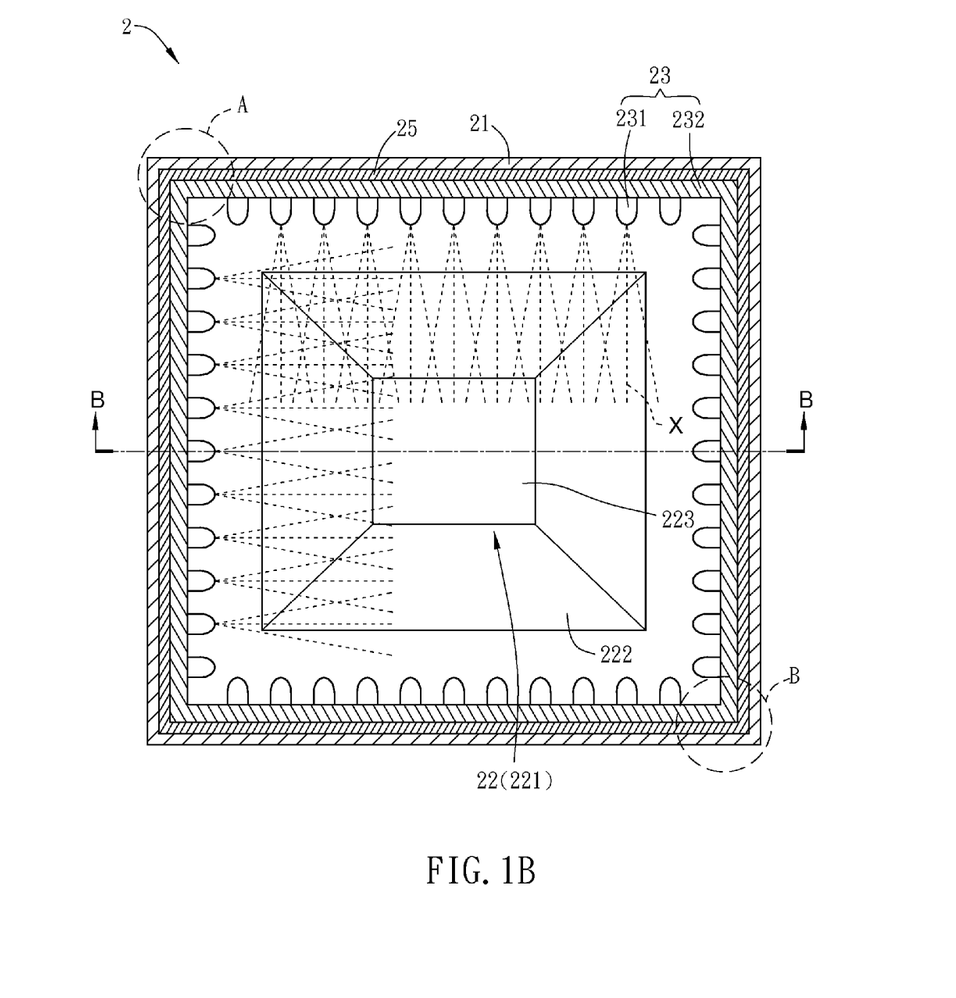
FIG. 1B is a top view of the illumination apparatus of FIG. 1A.
Figure 1C:
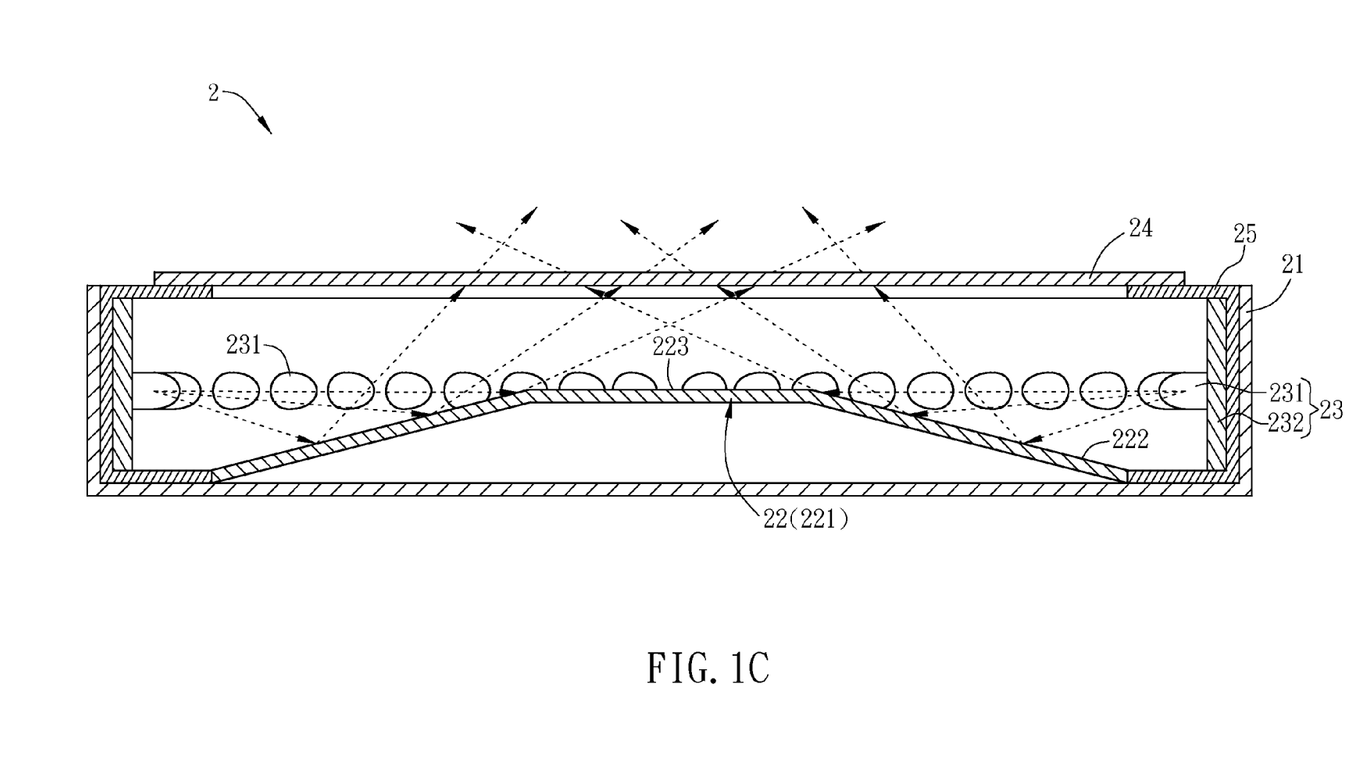
FIG. 1C is a sectional view along the line B-B of FIG. 1B.

FIG. 1A is a perspective diagram of an illumination apparatus 2 according to a preferred embodiment of the invention, FIG. 1B is a top view of the illumination apparatus 2, and FIG. 1C is a sectional view along the line B-B of FIG. 1B.

The illumination apparatus 2 includes a frame 21, an optical base plate 22, a light source 23 and an optical film 24. Besides, the illumination apparatus 2 may optionally include a reflective cap 25.

The optical base plate 22 is disposed in the frame 21 and has a first protrusion portion 221, which has at least one reflective surface. In this embodiment, the shape of the optical base plate 22 can be a normal polygon such as a square (see FIG. 1B). The first protrusion portion 221 is located at the center of the optical base plate 22 and is protruded upwardly. In this case, the first protrusion portion 221 has four reflective surfaces 222. Alternatively, the shape of the optical base plate 22 can be a circle or any normal polygon such as a normal hexagon, octagon, decagon or the likes. If the shape of the optical base plate 22 is a circle, the first protrusion portion 221 has one reflective surface 222 only. The shape of the optical base plate 22 corresponds to that of the frame 21. For example, if the shape of the optical base plate 22 is a square, the shape of the frame 21 is a square too. Otherwise, if the shape of the optical base plate 22 is a circle, the shape of the frame 21 is a circle too.

In this embodiment, the first protrusion portion 221 further includes a top surface 223, which is disposed opposite to the optical film 24 and connected with the reflective surface 222. Herein, the top surface 223 is a planar surface facing the optical film 24 and connected with four reflective surfaces 222.

The light source 23 is disposed in the frame 21 and located adjacent to the periphery of the optical base plate 22. Herein, the light source 23 is disposed corresponding to the reflective surface 222 and has a plurality of light-emitting elements 231. In this embodiment, four reflective surfaces 222 are configured, so the illumination apparatus 2 includes four light sources 23 disposed around the periphery of the optical base plate 22. That is, the number of the reflective surfaces 222 is identical to the number of the light sources 23. Each light source 23 has a plurality of light-emitting elements 231. In this embodiment, the light source 23 can be an LED bar, while the light-emitting element 231 is an LED disposed on a substrate 232, which is fixed in the reflective cap 25. The LED is installed on the substrate 232 by SMD technology, and the radiated half-power of the light-emitting element 231 is below 25 dB. The lighting angle of the light-emitting element 231 toward the direction perpendicular to the substrate 232 is between 5-25 degrees, and preferably between 5-20 degrees. The lighting angle of the light-emitting element 231 toward the direction parallel to the substrate 232 is between 10-75 degrees, and preferably between 30-60 degrees. As a result, the illumination apparatus 2 has high directive property. Each light-emitting element 231 has an optical axis direction X extending toward the first protrusion portion 221. As shown in FIG. 1B, the light emitted from the light-emitting element 231 is projected onto the first protrusion portion 221 in a normal or inclined direction. In order to make the figure cleaner, only the optical axis directions X of the light-emitting elements 231 of two light sources 23 disposed at two sides of the optical base plate 22. In addition, in some preferred modes, a bar of LED lens can be disposed in front of the aforementioned SMD LED light bar (i.e., the light source 23), and the light source 23 and the bar of LED lens are arranged to function as a linear light source which has a narrow-angle light field pattern.

Figure 1D:
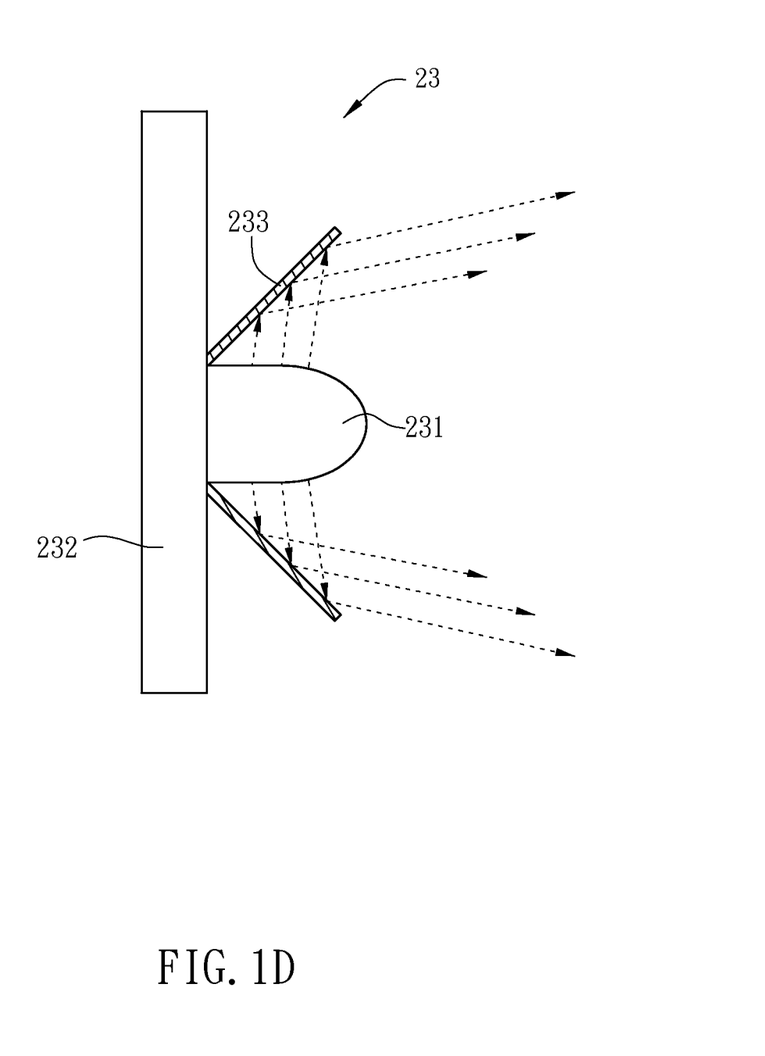
FIG. 1D is a schematic diagram showing another light source of the illumination apparatus.

To be noted, a reflective plate 233 with high reflective property can be provided on the substrate 232 (see FIG. 1D) for adjusting the large-angled light emitted from the light-emitting element 231. This configuration can further enhance the light extraction efficiency. The reflective plate 233 is fittingly attached on and parallel to the substrate 232. Otherwise, the reflective plate 233 may have an included angle with the substrate 232 due to the first protrusion portion 221. In this aspect, two reflective plates 233 are disposed at two sides of the light-emitting element 231, respectively, and each has an included angle with the substrate 232.

Besides, as shown in FIG. 1B, two opposite corners of the frame 21 of the illumination apparatus 2 (areas A and B) are configured without the light-emitting element 231. Of course, it is possible to configure an LED light source (not shown) at each corner of the frame (FIG. 1B shows four corners). The optical axis direction of the LED light source directs toward the first protrusion portion 221, thereby improving the illuminance of the illumination apparatus 2. To be noted, FIG. 1B is for an illustration only and is not to restrict the relative ratio and shape of the LED and frame 21. In some embodiments, when the shape of the optical base plate 22 (and the frame 21) is a circle, the light-emitting elements 231 are uniformly disposed at the periphery of the optical base plate 22.

The optical film 24 is disposed in the frame 21. Referring to FIG. 1C, the optical film 24 is connected with the reflective cap 25, and the first protrusion portion 221 of the optical base plate 22 protrudes towards the optical film 24. The optical film 24 can be a transparent sheet or a transparent film such as a diffuser sheet (film), a brightness enhancement sheet (film), a prism sheet, or their combinations. In this embodiment, the optical film 24 is a diffuser film.

As mentioned above, the light-emitting element 231 has the high directive property, and the optical axis direction D thereof protrudes toward the first protrusion portion 221. Accordingly, most of the light emitted toward the optical base plate is projected onto the reflective surface 222 of the first protrusion portion 221. This configuration can reduce the portion of light scattered by a part of the optical film 24 directly adjacent to the light-emitting element 231, thereby preventing the illuminance of the edge of the optical film 24 to be larger than that of the center of the optical film 24. Since the center of the first protrusion portion 221 of the optical base plate 22 is closest to the optical film 24, the portion of light scattered by the center part of the optical film 24 is increased. This configuration can improve the phenomenon that the illuminance of the edge of the optical film 24 to be larger than that of the center of the optical film 24, which is caused by the locations of the light-emitting elements 231 around the optical base plate 22. As a result, the optical film 24 can form a uniform lighting surface. Moreover, the configuration of the top surface 223 can further increase the brightness uniformity of the illumination apparatus 2 by about 5-10%. Besides, since the light-emitting elements 231 are disposed around the periphery of the optical base plate 22, the light reflection with more angles can be induced within the first protrusion portion 221 of the optical base plate 22. Thus, the light scattered from the optical film 24 can be more uniform.

The reflective cap 25 is disposed at the periphery of the optical base plate 22, and is connected with the optical base plate 22, the optical film 24 and the frame 21 separately. The reflective cap 25 can effectively reflect the residual part of light emitted from the light-emitting elements 231, which is not toward the first protrusion portion 221, to the reflective surface 222, thereby further increasing the lighting efficiency of the illumination apparatus 2.

Figure 2:
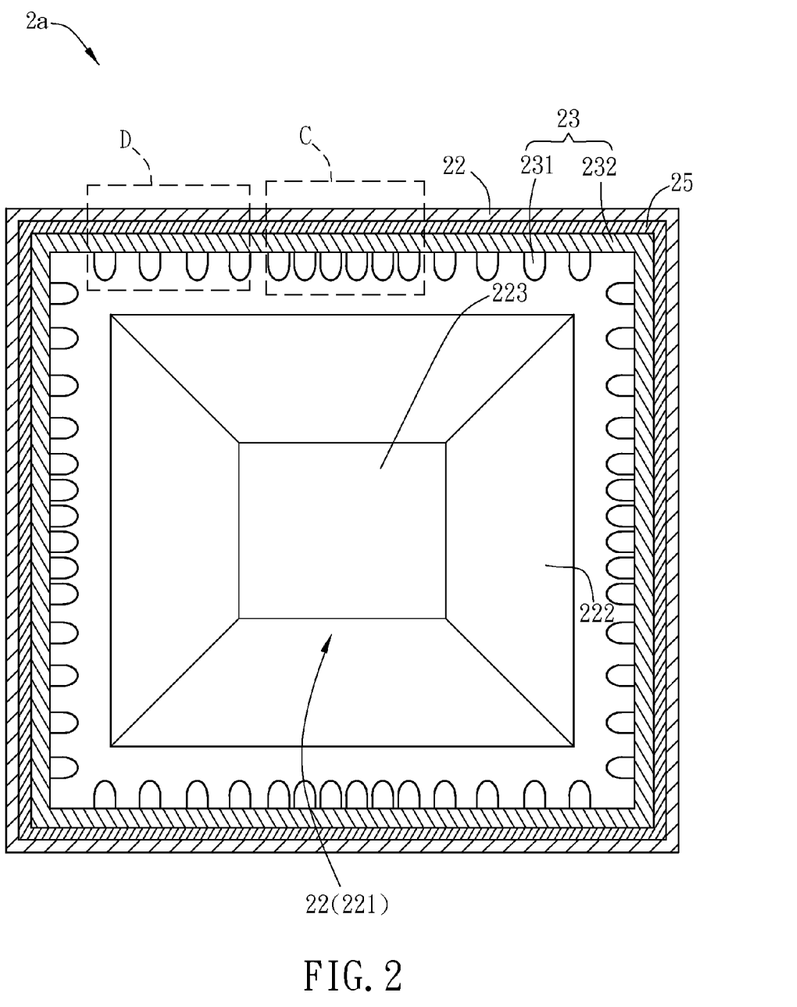
FIG. 2 is a top view showing another aspect of the illumination apparatus.

FIG. 2 is a top view showing an illumination apparatus 2a according to another aspect of the invention.

Different from the above-mentioned illumination apparatus 2, the illumination apparatus 2a has higher configuration density of the light-emitting elements 231 at the center of the substrate 232 and lower configuration density of the light-emitting elements 231 at the edge of the substrate 232. In other words, the distance between two adjacent light-emitting elements 231 in the center area C of the substrate 232 is smaller, while the distance between two adjacent light-emitting elements 231 in the side area D of the substrate 232 is larger.

Figure 3A:
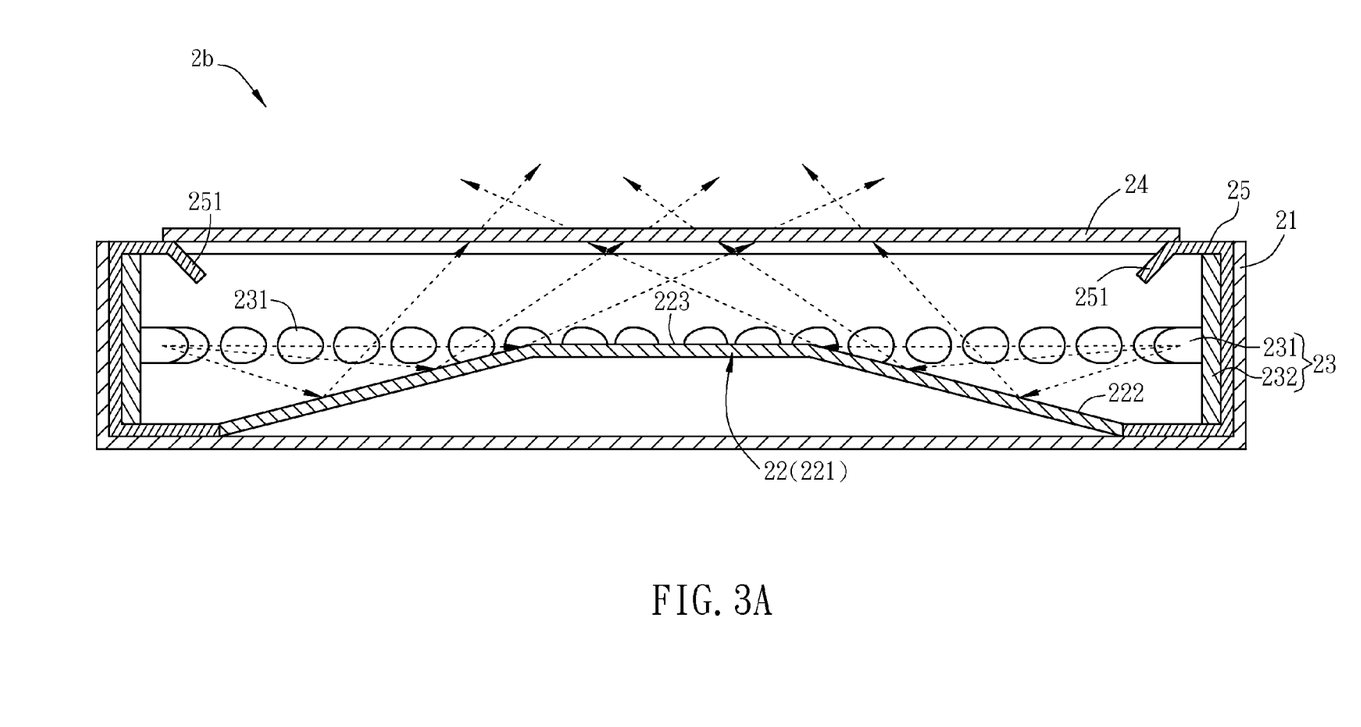
FIGS. 3A to 3C are schematic diagrams showing another aspect of the illumination apparatus of the invention.

FIG. 3A is a schematic diagram showing an illumination apparatus 2b according to another aspect of the invention.

Different from the above-mentioned illumination apparatus 2, the illumination apparatus 2b further has a bending portion 251 configured at the connection between the reflective cap 25 and the optical film 24, and the bending portion 251 is bent toward the optical base plate 22. Accordingly, the optical film 24 can effectively reflect a part of light adjacent to the light-emitting elements 231 to the illumination apparatus 2b, thereby eliminating the bright band of the optical film 24 at the place adjacent to the light-emitting elements 231.

The other technical features of the illumination apparatus 2b are identical to those of the illumination apparatus 2, so the detailed descriptions thereof will be omitted.

Figure 3B:
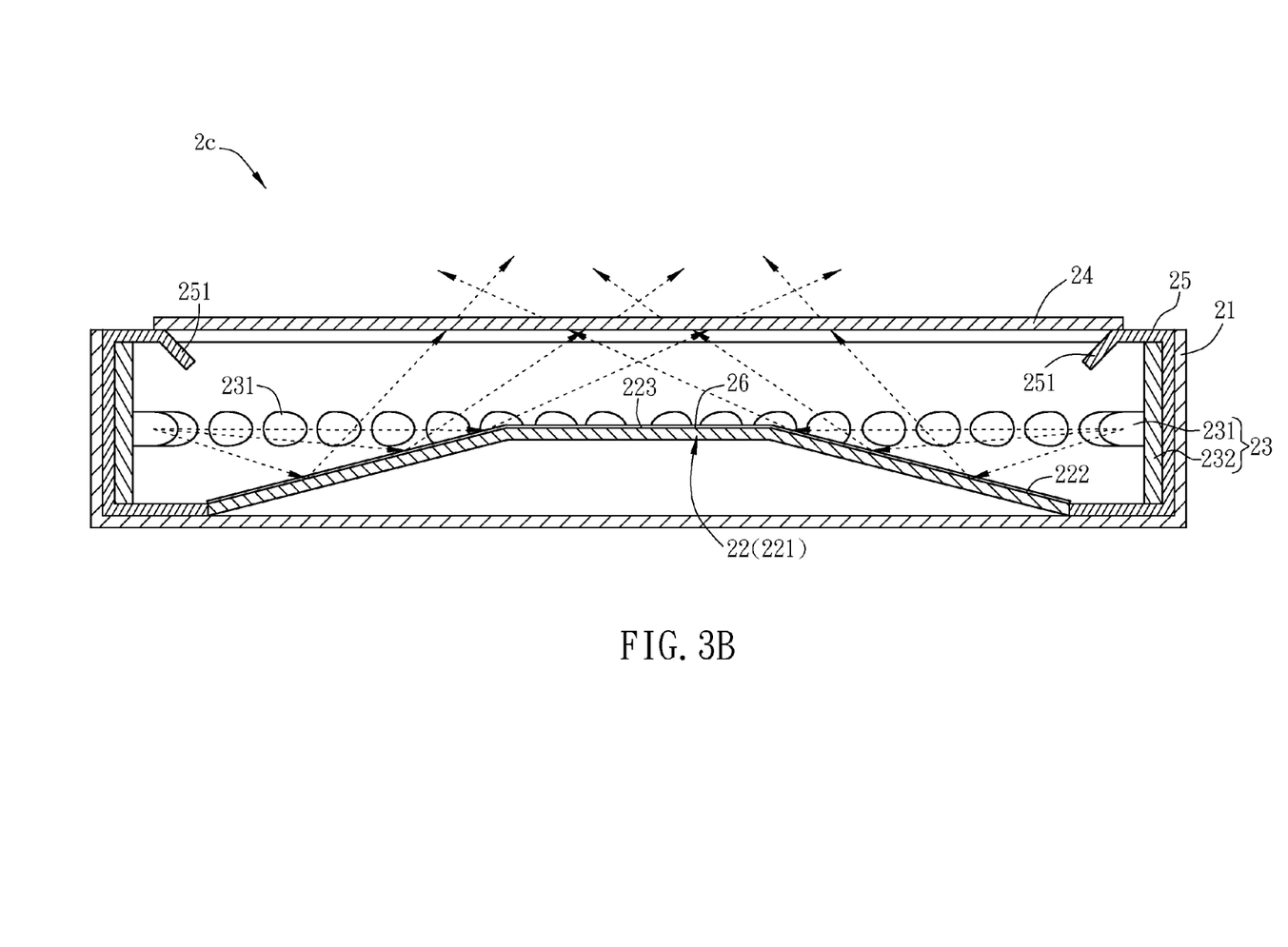

FIG. 3B is a schematic diagram showing an illumination apparatus 2c according to another aspect of the invention.

Different from the above-mentioned illumination apparatus 2, the illumination apparatus 2c further has a reflective film 26 disposed on the first protrusion portion 221. The material of the reflective film 26 may include metal, epoxy, or a mixture of $TiO_2$ and resin. The applicable metal includes silver, chromium, or nickel, and the metal can be disposed on the reflective surface 222 and the top surface 223 to form the reflective film 26 by electroplating, evaporating, sputtering, or attaching. This configuration can increase the light reflectivity of the first protrusion portion 221, and thus enhance the light extraction efficiency and illuminance of the illumination apparatus 2c.

Figure 3C:
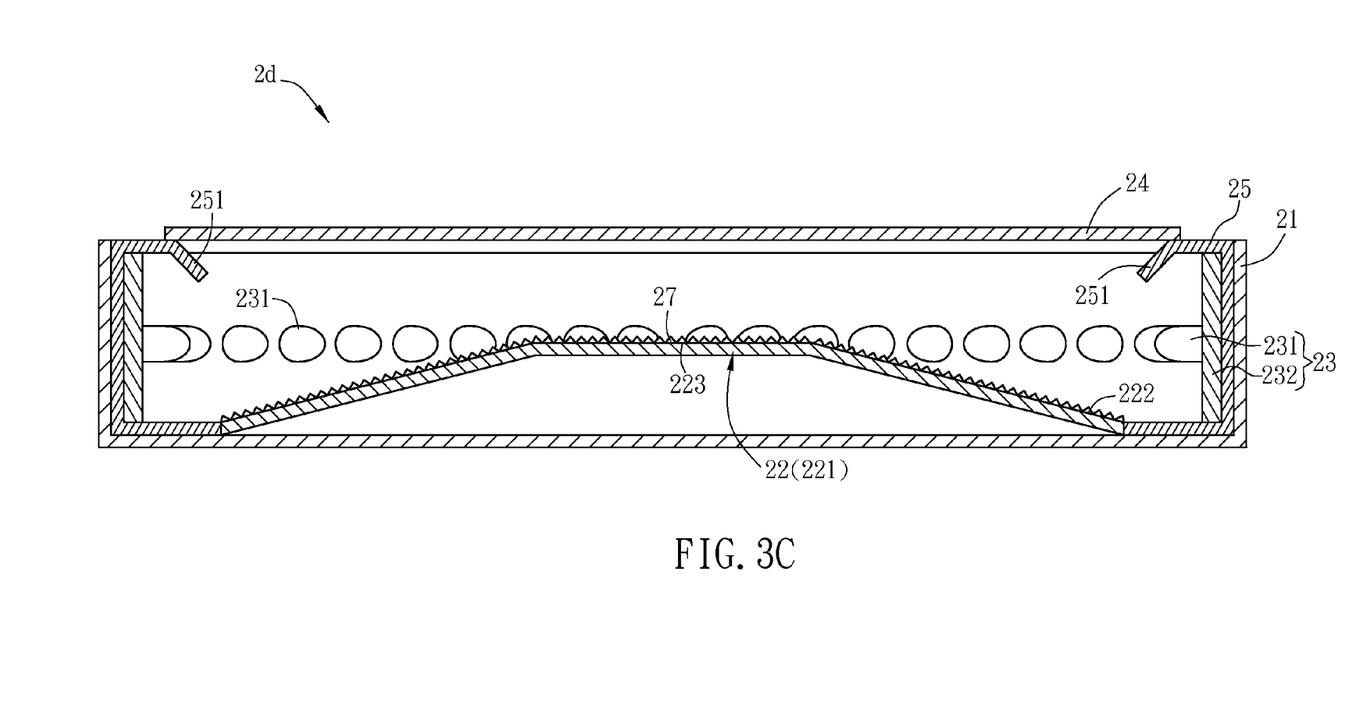

FIG. 3C is a schematic diagram showing an illumination apparatus 2d according to another aspect of the invention.

Different from the above-mentioned illumination apparatus 2, the illumination apparatus 2d further has an optical structure 27 disposed on the first protrusion portion 221. For example, the optical structure 27 is a microstructure disposed on the reflective surface 222 and the top surface 223 for scattering the light, thereby improving the light output uniformity of the illumination apparatus 2d.

The other technical features of the illumination apparatuses 2c and 2d are identical to those of the illumination apparatus 2b, so the detailed descriptions thereof will be omitted.

Figure 3D:
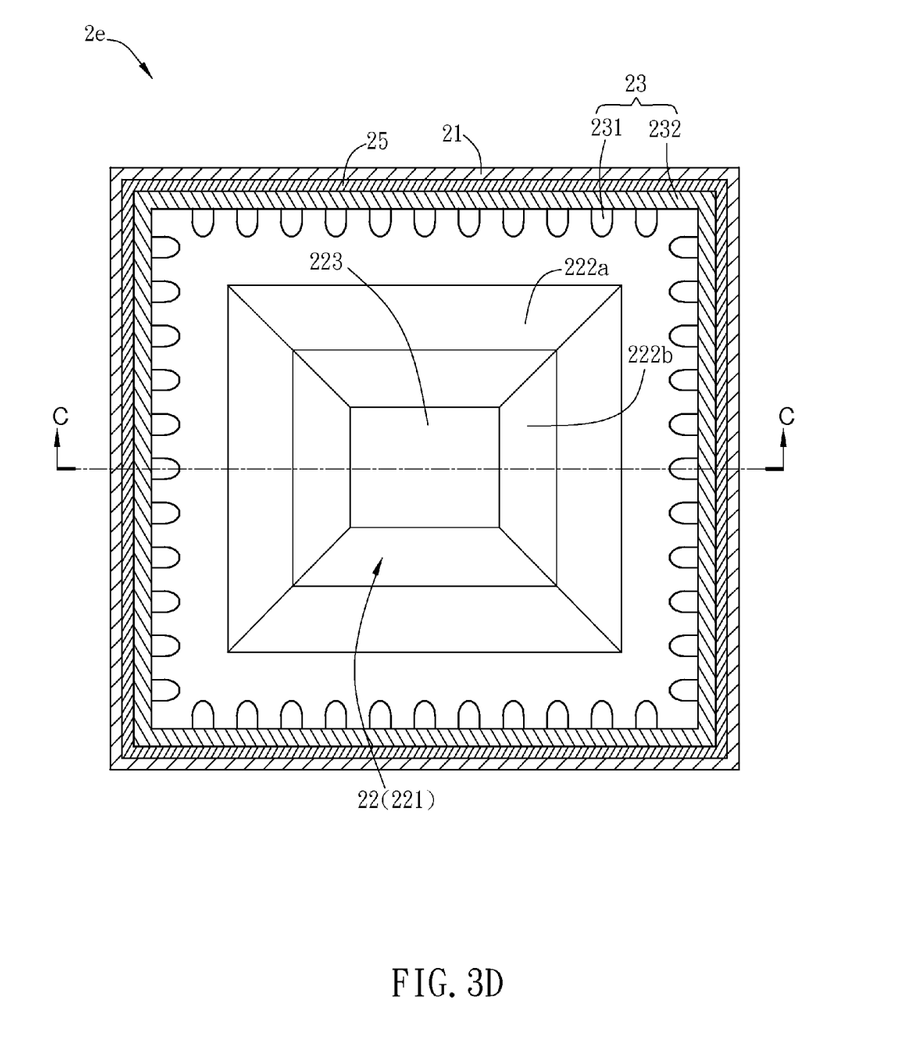
FIG. 3D is a top view of another aspect of the illumination apparatus.
Figure 3E:
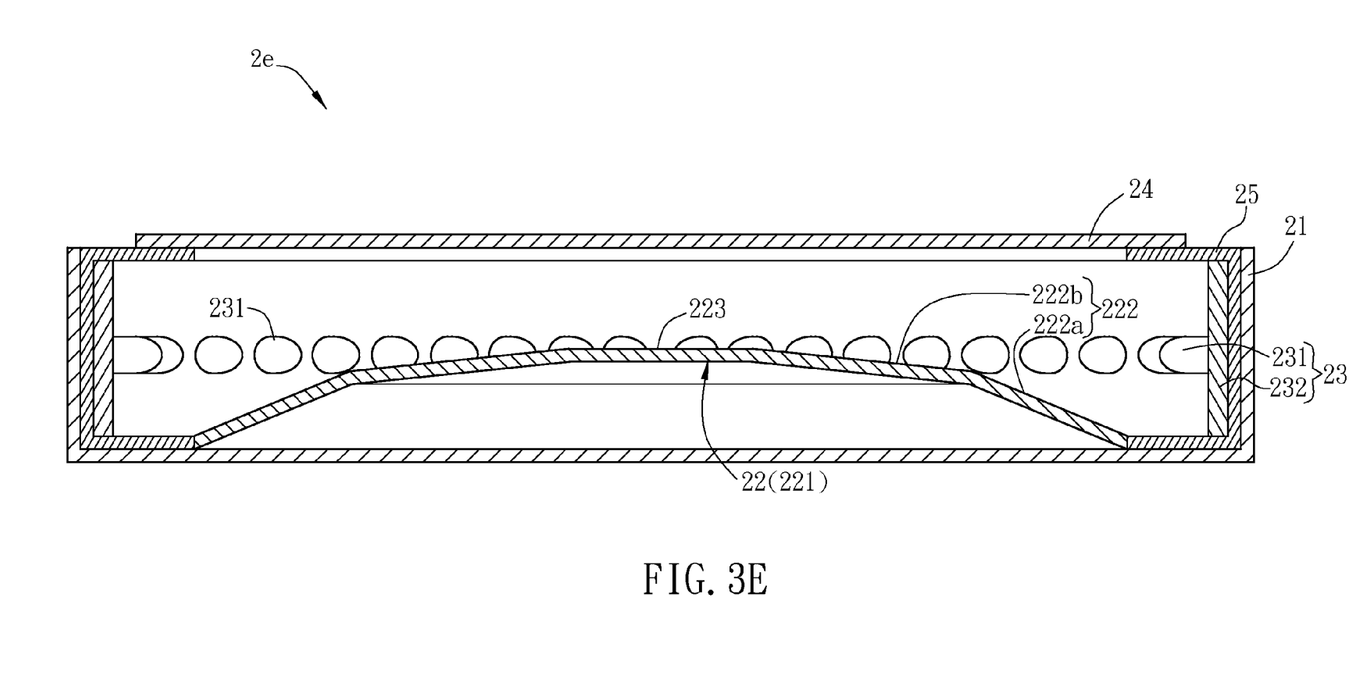
FIG. 3E is a sectional view along the line C-C of FIG. 3D.

FIG. 3D is a top view of an illumination apparatus 2e according to another aspect of the invention, and FIG. 3E is a sectional view along the line C-C of FIG. 3D.

Different from the above-mentioned illumination apparatus 2, the reflective surface 222 of the illumination apparatus 2e includes two high-reflective inclined surfaces 222a and 222b, which have different inclination angles. In this case, the inclination angle of the inclined surface 222a is larger than that of the inclined surface 222b. Of course, in other aspects, the inclination angle of the inclined surface 222a may be smaller than that of the inclined surface 222b.

The other technical features of the illumination apparatuses 2a to 2e are identical to those of the illumination apparatus 2, so the detailed descriptions thereof will be omitted.

Figure 3F:
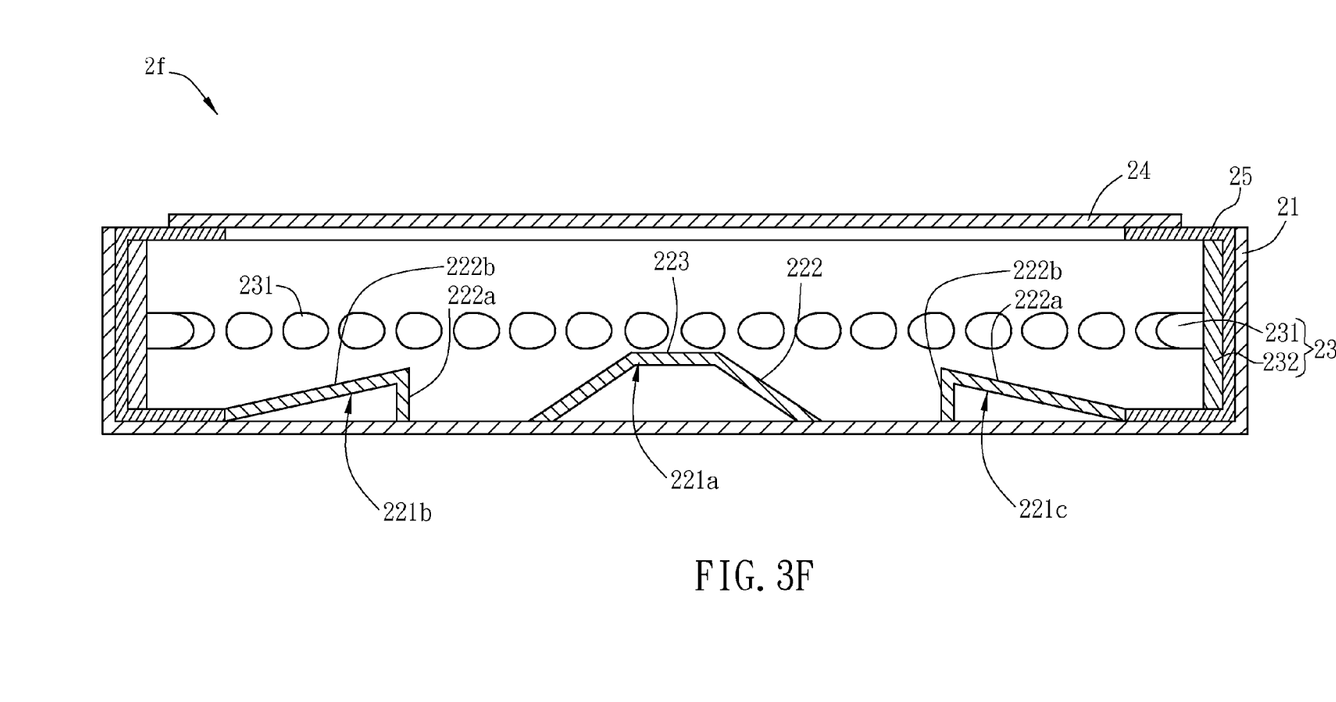
FIG. 3F is a sectional view of another aspect of the illumination apparatus.

FIG. 3F is a sectional view of an illumination apparatus 2f according to another aspect of the invention.

Different from the above-mentioned illumination apparatus 2, the illumination apparatus 2f includes four additional second protrusion portions disposed around the first protrusion portion 221 and located at two sides of the first protrusion portion 221. To be noted, FIG. 3F is a sectional view so only two protrusion portions 221a and 221c are shown. Each of the second protrusion portions 221a and 221c has two high-reflective inclined surfaces 222a and 222b. The other technical features of the illumination apparatuses 2a-2f are identical to those of the illumination apparatus 2, so the detailed descriptions thereof will be omitted.

When the dimension of the illumination apparatus increases, it is possible to configure a second protrusion portion, a third protrusion portion, a fourth protrusion portion, or more for enhancing the light extraction efficiency and light output uniformity. The number and inclination angle of the configured protrusion portions are variable according to the requirement, and this invention is not limited. To be noted, the illumination apparatus of the invention is not limited to the illumination application (e.g. a flat lamp). For example, the illumination apparatus of the invention can function as a backlight module in a display apparatus. Besides, the light emitted from the light-emitting element may partially travel toward the light base plate and the protrusion portion thereof, and partially travel toward and penetrate through the optical film. The traveling path and effect of the partial light penetrated through the optical film are known by those skilled persons, so the detailed descriptions thereof will be omitted.

In summary, the illumination apparatus of the invention has an optical base plate with a first protrusion portion. The first protrusion portion has at least a reflective surface and a top surface connected with each other. The light source is located adjacent to the periphery of the optical base plate, and is disposed corresponding to the reflective surface. The light source has a plurality of light-emitting elements, each of which has an optical axis direction extending toward the first protrusion portion. Accordingly, the conventional light guiding plate is unnecessary in the illumination apparatus of the invention, and the illumination apparatus of the invention has the advantages of lower cost, higher light extraction efficiency and better light output uniformity.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An illumination apparatus, comprising:
   a frame;
   an optical base plate disposed in the frame and having a first protrusion portion at the center thereof, wherein the first protrusion portion has at least a reflective surface and a top surface, and the top surface is connected with the reflective surface;
   a light source disposed in the frame and located adjacent to the periphery of the optical base plate, wherein the light source is disposed corresponding to the reflective surface and has a plurality of light-emitting elements, each of the light-emitting elements has an optical axis direction, and the optical axis directions extend toward the first protrusion portion;
   an optical film disposed at the frame, wherein the first protrusion portion of the optical base plate protrudes toward the optical film; and
   a reflective cap disposed at the periphery of the optical base plate and connected with the optical base plate, the optical film and the frame, wherein the light-emitting elements are disposed on the reflective cap;
   wherein a bending portion is configured at the connection between the reflective cap and the optical film, and the bending portion is bent toward the optical base plate.

2. The illumination apparatus of claim 1, wherein the shape of the optical base plate comprises a normal polygon or a circle.

3. The illumination apparatus of claim 1, wherein the shape of the optical base plate corresponds to the shape of the frame.

4. The illumination apparatus of claim 2, wherein as the shape of the optical base plate is a circle, the light-emitting elements are uniformly disposed at the periphery of the optical base plate.

5. The illumination apparatus of claim 1, wherein the light source further comprises a substrate, and the light-emitting elements are disposed on the substrate.

6. The illumination apparatus of claim 5, wherein a part of the light-emitting elements disposed close to the center of the substrate has higher distribution density than a part of the light-emitting elements disposed away from the center of the substrate.

7. The illumination apparatus of claim 5, wherein the light source further comprises a reflective plate disposed on the substrate.

8. The illumination apparatus of claim 1, further comprising:
   a reflective film disposed on the first protrusion portion.

9. The illumination apparatus of claim 1, further comprising:
   an optical structure disposed at the first protrusion portion.

10. The illumination apparatus of claim 1, wherein the optical base plate further comprises at least a second protrusion portion disposed adjacent to the first protrusion portion, and the second protrusion portion has at least a reflective surface.

\* \* \* \* \*